Feb. 12, 1935.  K. HASHIMOTO  1,990,941
VEHICLE STABILIZING DEVICE
Filed Nov. 25, 1931
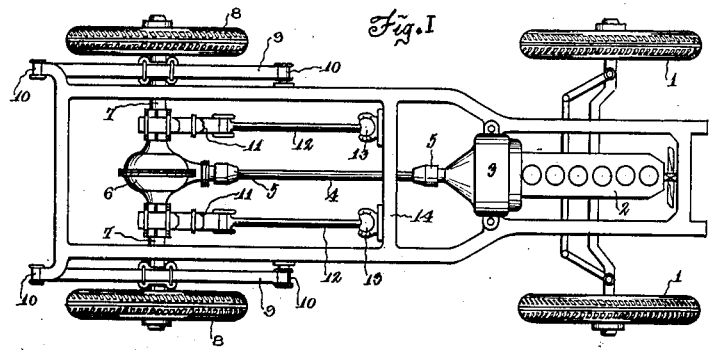
Fig. I
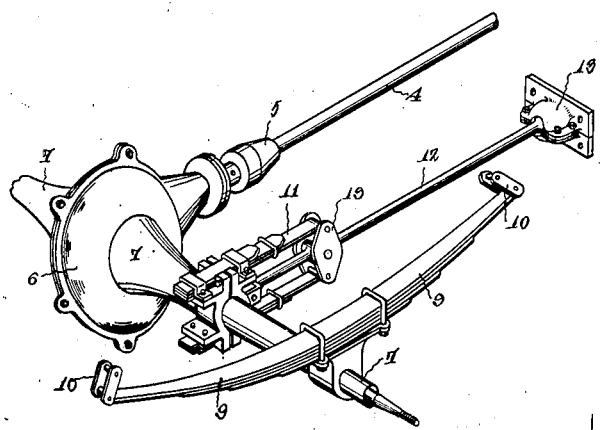
Fig. II
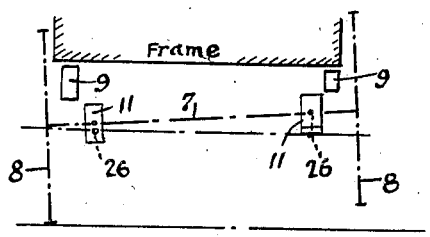
Fig. IV
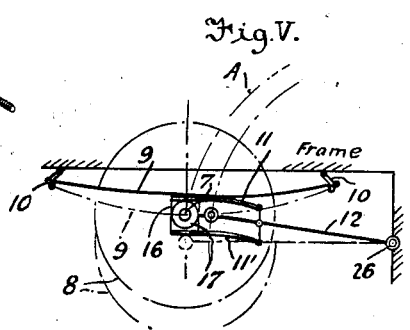
Fig. V
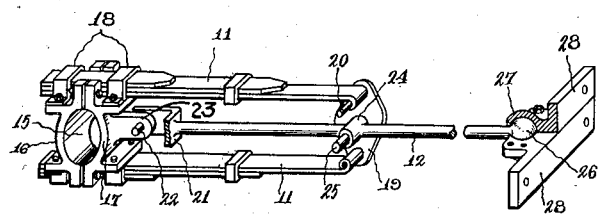
Fig. III
K. Hashimoto
INVENTOR
By: Marks & Clerk
Att'ys.

Patented Feb. 12, 1935

1,990,941

UNITED STATES PATENT OFFICE 1,990,941

VEHICLE STABILIZING DEVICE

Kisuke Hashimoto, Yanaka, Shitaya Ku, Tokyo, Japan

Application November 25, 1931, Serial No. 577,365
In Japan January 10, 1931

3 Claims. (Cl. 267—67)

The present invention has reference to an improved vehicle suspension and as the primary object contemplates the provision of an apparatus of the above character wherein improved means are employed for ensuring of comfortable riding in a motor vehicle when driving, said means acting to yieldingly support the body for preventing jolting.

Other objects, as well as the nature, characteristic features, and scope of the invention will be more readily apparent from the following description taken in connection with the accompanying drawing and pointed out in the claims forming a part of this invention.

The invention is clearly illustrated in the accompanying drawing, in which:—

Fig. 1 is a plan view,

Fig. 2 is a perspective detail showing the device as applied to the rear axle casing, and Fig. 3 is another perspective detail.

Figs. 4 and 5 are diagrammatic end and side views showing the position assumed by the parts when the rear axle casing is subjected to a non-parallel movement.

Similar characters of reference are employed in all of the above described views to indicate corresponding parts.

Referring now, more particularly to the accompanying drawing, there is provided a motor vehicle frame to which is connected in the customary manner the front supporting wheels 1. The motor 2 is mounted at the fore end of the frame and associated with suitable transmission apparatus 3. A drive shaft 4 is connected by universal joints 5 to the transmission apparatus 3 and to the differential casing 6, the latter being in connection with the rear axle casing 7. Rear wheels 8 are connected with the rear axle sections contained in casing 7. Leaf supporting springs 9 are connected at their ends by shackles 10 to the sides of the frame and connected medially of their ends with the rear axle casing 7 as shown in Fig. 2. Additional leaf springs 11 are employed as control springs. In order to increase the riding comfort of the vehicle, to assist in the yielding supporting of the car on the body and for maintaining the parts in the proper position control springs 11 are provided. These springs are attached to the rear axle casing and are operably connected with longitudinally extending rods 12 which act as radius rods, the rods incidentally being operatively connected to the rear axle casing and to the transverse beam 14 of the frame.

To explain the essential parts of this improved means particular reference is made to Figs. 2 and 3 wherein semi-circular bearing brackets 16 and 17 are fixed to the rear axle casing 7 by suitable fastening means so as to hold them in circular formation as at 15. One end of each of the springs 11 is clamped respectively to the top and to the bottom of the brackets 16, 17 by straps 18. The opposite ends of these springs terminate in eyes and engage pintles 20 in diamond shaped parallel links 19. The connecting or radius rods 12 are arranged between the links and between the springs the rear ends thereof being forked as at 21 and fulcrumed about pintles 22 which are mounted in the holes of ears 23 projecting from the brackets 17. The medial portion of the rods are enlarged at 24 and provided with transverse openings fulcrumed about pintles 25 carried medially of the links 19. The forward end of each rod terminates in a ball 26 which is universally arranged between complemental universal joint sections 27 carrying flanges 28 through which they are secured to the beam 14.

In operation the connecting rods 12 swing vertically and simultaneously with each other about the joints 26 and remain in alignment with the ears 22 during parallel movement of the axle housing relative to the frame, while the springs 9 act to absorb shocks etc. When however an angular or non-parallel movement of the axle housing occurs, as when one end of the axle is lifted, the rods 12 swing in opposite directions relative to the ears 22 which maintain a horizontal position and flex the springs 11 whereby the latter absorb the jolts. In either case, neither the control springs 11 nor the supporting springs 9 interferes with the function of the other.

It is believed in view of the foregoing that a further detailed description of the operation of the invention is entirely unnecessary. Likewise it is believed that the advantages of the invention will be readily apparent.

Having thus fully described the invention what is claimed as new and desired to be secured by Letters Patent is:

1. The combination with a motor vehicle frame having an intermediate transverse beam and a rear axle casing, of a pair of load supporting springs interposed between the frame and axle casing, a pair of longitudinally extending radius rods having their respective ends attached to the rear axle casing and to the transverse beam of the frame, a pair of control springs having their rear ends fixed to the rear axle casing and having their front ends pivotally mounted relatively to the adjacent radius rods to perform the functions of absorbing torque and controlling the car by the combined action with the radius rods against jolting to the left and right or diagonal direction without injuring the function of either of the load supporting springs.

2. An arrangement as claimed in claim 1, wherein semi-circular brackets are connected to the axle casing and serve as a means for supporting and fixing the rear ends of the control springs and also for operably connecting the radius rods to the rear axle casing.

3. An arrangement as claimed in claim 1, wherein links are fulcrumed to the medial portions of the radius rods and act as a means for pivotally supporting the front ends of the control springs above and below the said rods.

KISUKE HASHIMOTO.